June 30, 1964 — M. WEISMAN — 3,139,344

MEANS FOR BREWING INDIVIDUAL SERVINGS OF COFFEE IN A CUP

Filed Nov. 3, 1961

INVENTOR.
Maurice Weisman
BY
Ezekiel Wolf, Wolf & Greenfield
ATTORNEYS

United States Patent Office 3,139,344
Patented June 30, 1964

3,139,344
MEANS FOR BREWING INDIVIDUAL SERVINGS OF COFFEE IN A CUP
Maurice Weisman, 10 Royce St., Framingham, Mass.
Filed Nov. 3, 1961, Ser. No. 150,011
2 Claims. (Cl. 99—77.1)

The present invention relates to a means and method of brewing drinks and more particularly to an improved means and method of brewing individual cups of coffee or tea from individual water infusible bags containing ground coffee or tea leaves.

Coffee has been packaged in water infusible bags for individual servings in much the same manner as tea is packaged. Such coffee bags have not attained the same degree of commercial success as tea bags. This may be due, at least in part, to problems inherent in brewing coffee from such coffee bags which are not present in brewing tea from tea bags. A good cup of coffee requires at least four times as much coffee beans by weight as a good cup of tea requires tea leaves for brewing. Coffee bags must therefore be larger. It follows that when a coffee bag is used for brewing coffee a substantially greater amount of water is removed with the bag than in the case of tea brewing.

In addition a properly brewed cup of coffee requires a precise control of the brewing or steeping time. If the bag is allowed to remain in the water too long, the coffee becomes bitter and the grounds seep through the infusible bag into the cup. If the bag is removed too soon the coffee is weak. In addition when coffee bags are used and water is placed in direct contact with the bags the user usually stirs the water thereby causing sediment to pass through the wall of the bag into the cup. In addition it has been difficult in brewing coffee from coffee bags to brew the coffee in a reasonably short time and to calculate the correct amount of water for each bag of coffee.

Difficulty has also been encountered in brewing tea because most people fail to allow the tea to steep a sufficient time to bring out maximum flavor and body. In addition a problem often arises with respect to keeping the brew hot while the tea is steeping.

The present invention is designed to overcome the foregoing problems. Means are provided for brewing coffee from coffee bags quickly and efficiently. Loss of water by absorption in the bag is minimized so that a full cup of coffee may be brewed. The steeping time is automatically controlled so that the cup of coffee has exactly the desired strength and the correct proportion of water to coffee. In addition the present invention provides an improved form of steeping in which hot water passes through the bag and the ambient atmosphere about the bag is maintained hot by water vapors and steam.

The present invention also provides an improved method and means for brewing tea in which the tea bags must be brewed for a predetermined period of time (preferably five minutes) and the brew in the cup is kept hot.

These and other objects and advantages of the present invention will be more clearly understood when considered in conjunction with the accompanying drawings in which.

Figure 1:
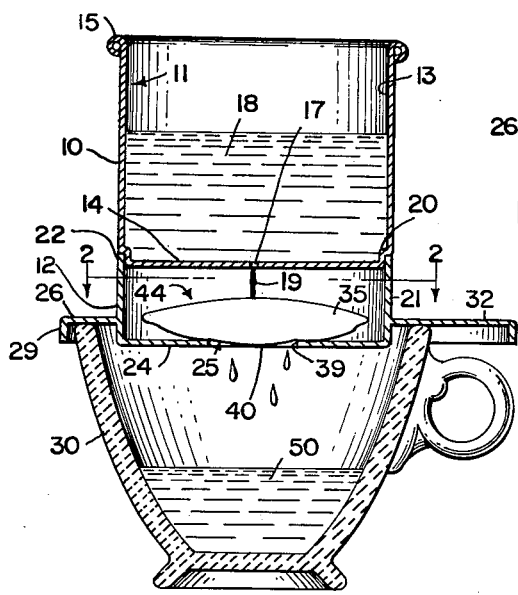
FIG. 1 is a cross sectional elevation of a means for brewing coffee utilizing the present invention.
Figure 2:
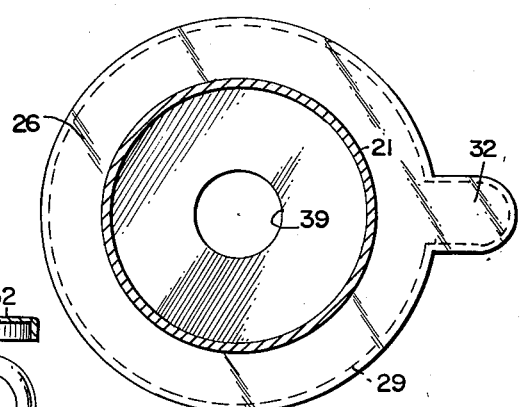
FIG. 2 is a cross sectional view taken along the line 2—2 of FIG. 1.

In the preferred form of the invention illustrated in FIGS. 1 and 2, there is provided container means generally illustrated at 10 which comprises an upper and lower containers or sections 11 and 12 respectively. These containers 11 and 12 are formed of suitable heat and water resistant material such as aluminum or the like. Upper section 11 forms a container having an annular wall 13 and a bottom 14 continuous with the wall 13. The upper edge or lip of the upper section 11 may be rolled or peened as illustrated at 15. A single aperture 17 is centrally located in the upper section 11. This aperture is the only hole formed in the bottom of the upper section and has a diameter of between approximately $\frac{1}{16}'$ and $\frac{5}{64}''$. The aperture should be so dimensioned that water such as illustrated at 18 may flow from the upper section through the aperture in a very narrow stream as illustrated at 19. The peripheral lower edge of the wall 13 and the bottom 14 is formed with an annular shoulder section 20.

The lower section 12 is formed with an annular side wall 21 having its upper edge 22 adapted to engage the shoulder 20. The bottom of the side wall 21 is formed with an inwardly flared annular flange 24 forming a large opening 25. The space between the flange 24 and the bottom 14 of the upper section 11 when the two sections are interengaged as illustrated should be approximately $1''$ to $1\frac{1}{4}''$. Aperture 25 should be approximately $1\frac{1}{4}''$ in diameter. An outwardly flared annular peripheral flange 26 is formed with an inner edge integral with the outer surface of wall 21. In the preferred form of this invention this flange 26 is secured close to the bottom edge of wall 21. The outer edge of flange 26 is formed with a downwardly extending lip 29 which acts to engage a cup such as illustrated at 30 and prevent the lower section from sliding off. A handle 32 may be formed integral with the flange 26.

A coffee bag 35 containing ground coffee beans and formed of a water infusible material such as described in United States Letters Patent No. 2,377,118 is positioned within section 12 when the coffee bag is being steeped. The edges of this bag should extend over the inner edges 39 of the flange 24 so that the lower surface 40 of bag 35 covers the aperture 25.

In use approximately six ounces of boiling water 18 are placed in the upper section 11 with a coffee bag 35 in the lower section 12. The edges of the bag extend over the inner edges of the aperture 25 and the top of the bag is spaced under the hole 17. Water 18 drips in a steady stream 19 onto the bag 35 thereby saturating the bag and generating hot water vapors and perhaps some steam into the upper portions of section 12 in an area indicated at 44. This water seeps through the bag 35 and drips through aperture 25 into the cup, carrying with it the desired coffee flavor. When the water 18 has emptied from the upper section 11, these sections 11 and 12 may be removed. It is preferable, however, to leave these sections 11 and 12 in position for a few minutes after all the water has drained from section 11 through the hole 17 to permit a maximum amount of water to pass through the bag 35.

In the embodiment illustrated in FIG. 1 the lower section 12 is formed with an outwardly flared flange 26 substantially at the same level as the inwardly flared flange 24. In use this positions the bag substantially above the level of the brewed coffee even after the level 50 has risen to almost the height of the lower section 12 and after almost all the water 18 has flowed through the aperture 17. This maintains the bag 35 in spaced relation to the top of the brewed coffee 50 at all times and minimizes the amount of spent grounds in bag 35 that diffuse into the brewed coffee.

Figure 3:
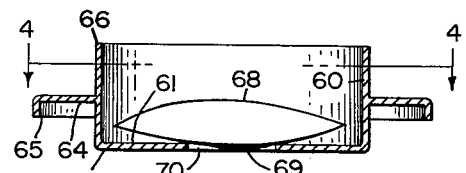
FIG. 3 is a modification shown in cross sectional elevation of an element shown in FIG. 1.

However, it is sometimes desirable to allow the bag to steep in the brewed coffee for a stronger cup. In such instances a modification of the lower section 12 illustrated in FIG. 1, may be employed. Such modification is illustrated in FIG. 3. In this arrangement the lower section 12 is formed with an annular wall 60 having inwardly flared flanges 61 corresponding with the inwardly flared flanges 24 of the modification illustrated in FIG. 1. An outwardly extending annular flange 64 having a downwardly extending lip 65 at its outer periphery is secured in integral relation with the outer surface of the wall 60 at a point substantially halfway between the upper edge 66 and the lower edge 67 of the wall 60. A coffee bag such as illustrated at 68 positioned within lower section 12 may then project downwardly and will upon saturation of the bag 68 bow down as illustrated at 69 and engage the top 50 of the brewed coffee. This is possible as aperture 70 in this modification may project down into the mouth of a cup 30 a considerable distance more than would a bag 35 in the modification illustrated in FIG. 1.

Figure 5:
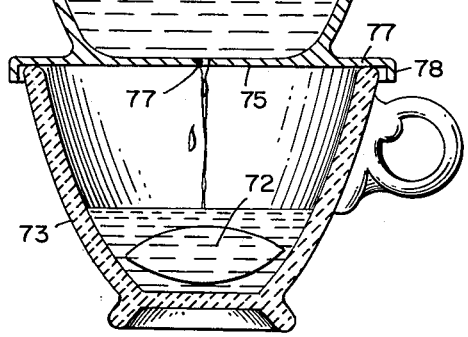
FIG. 5 illustrates a cross sectional elevation of a further modification of the present invention.
Figure 4:
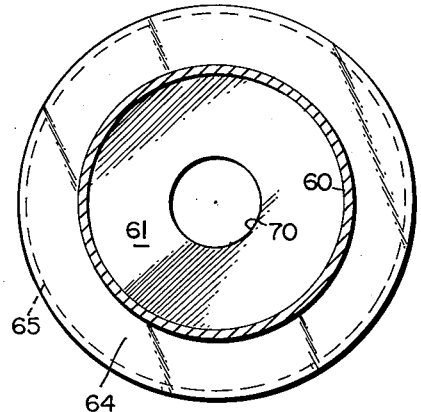
FIG. 4 is a cross sectional view of the modification shown in FIG. 3 taken along the line 4—4 of FIG. 3.

In the modification illustrated in FIG. 5, a coffee bag 72 may be contained within a cup 73. A container 74 having side walls 76 and integral bottom 75 is supported over the cup 73 by an outwardly flared flange 77, which has a downwardly extending lip 78 at its outer periphery. An opening 77 of the same size as opening 17 permits the flow of boiling water 80 from the container 74 onto the coffee bag 72.

In this arrangement water flowing through the opening 77 onto the bag 72 will allow the bag to steep in the water within the cup and will at the same time maintain the cup 73 enclosed so as to keep it hot. This arrangement however is not as desirable as the arrangements and methods illustrated in FIGS. 1 to 4.

The arrangements illustrated in the drawings and particularly the modification of FIG. 3 may be used advantageously for brewing tea. However the apertures 25 and 70 should have uniform maximum diameters of one inch for brewing tea bags of about 35 to 42 grains. This will assure a brewing time of 3 to 5 minutes before the hot water in upper section 11 drains down into the cup through the tea bag. This arrangement will also maintain the brew hot for a prolonged period of time.

What is claimed is:

1. A means for brewing individual servings of coffee in a cup from a filled coffee bag comprising, container means having separable upper and lower sections, said upper section containing water and comprising a cylindrical container having a bottom with continuous side walls and an annular shoulder section adjacent said side walls, said bottom having a single aperture formed therein with a minimum diameter of substantially $1/16$ of an inch and a maximum diameter of substantially no more than $5/64$ of an inch whereby water contained in said upper section will drip slowly through said aperture, said lower section having an open top and bottom with side walls engaging said shoulder section and containing a filled coffee bag having walls of water infusible material, said lower section having an inwardly flared flange at the lower edge thereof engaging and supporting said coffee bag directly beneath said aperture whereby said water dripping through said aperture will fall directly onto the center of said coffee bag at substantially one point, and means for supporting said lower section over a cup with said open bottom within the mouth of said cup comprising an outwardly flared flange lying in a plane normal to the side walls of said lower section with the inner edge of said outwardly flared flange integral with the outer surface of said side walls of said lower section and in spaced relation from and above said inwardly flared flange of said lower section whereby said inwardly flared flange of said lower section is maintained below the level of the rim of said cup when said outwardly flared flange is supported by said rim.

2. A means for brewing individual servings of coffee in a cup from a filled coffee bag comprising, container means having separable upper and lower sections, said upper section containing water and comprising a cylindrical container having a bottom with continuous side walls, said bottom having a single aperture formed therein with a minimum diameter of substantially $1/16''$ and a maximum diameter of substantially no more than $5/64''$ whereby water contained in said upper section will drip slowly through said aperture, said lower section having an open top and bottom with side walls engaging said upper section and containing a filled coffee bag having walls of water infusible material, said lower section having an inwardly flared flange at the lower edge thereof engaging and supporting said coffee bag directly beneath said aperture whereby said water dripping through said aperture will fall directly onto the center of said coffee bag at substantially one point, and means for supporting said lower section over a cup with said open bottom over the mouth of said cup including means for engaging the lip of said cup.

References Cited in the file of this patent

UNITED STATES PATENTS

| | | |
|---|---|---|
| 1,146,922 | Childress | July 20, 1915 |
| 1,456,010 | Richheimer | May 23, 1923 |
| 1,499,281 | Altieri | June 24, 1924 |
| 2,358,556 | Block | Sept. 19, 1944 |
| 2,577,200 | Krause | Dec. 4, 1951 |
| 2,732,787 | Osborne | Jan. 31, 1956 |

FOREIGN PATENTS

| | | |
|---|---|---|
| 914,538 | France | Oct. 10, 1946 |